United States Patent [19]

Gupta et al.

[11] Patent Number: 5,608,885
[45] Date of Patent: Mar. 4, 1997

[54] METHOD FOR HANDLING INSTRUCTIONS FROM A BRANCH PRIOR TO INSTRUCTION DECODING IN A COMPUTER WHICH EXECUTES VARIABLE-LENGTH INSTRUCTIONS

[75] Inventors: Ashwani K. Gupta, Beaverton; Glenn J. Hinton; Chan W. Lee, both of Portland, all of Oreg.

[73] Assignee: Intel Corporation, Santa Clara, Calif.

[21] Appl. No.: 205,022

[22] Filed: Mar. 1, 1994

[51] Int. Cl.$^6$ .................................................. G06F 9/38
[52] U.S. Cl. ............................................................. 395/380
[58] Field of Search ...................... 364/DIG. 1 MS File, 364/DIG. 2 MS File; 395/375

[56]  References Cited

U.S. PATENT DOCUMENTS

| 4,394,736 | 7/1983 | Bernstein et al. | 364/200 |
| 4,399,505 | 8/1983 | Druke et al. | 364/200 |
| 4,591,972 | 5/1986 | Guyer et al. | 364/200 |
| 4,654,781 | 3/1987 | Schwartz et al. | 364/200 |
| 4,745,544 | 5/1988 | Renner et al. | 364/200 |
| 4,928,223 | 5/1990 | Dao et al. | 364/200 |
| 5,113,515 | 5/1992 | Fite et al. | 395/452 |
| 5,129,067 | 7/1992 | Johnson | 395/375 |
| 5,168,571 | 12/1992 | Hoover et al. | 395/800 |
| 5,202,967 | 4/1993 | Matsuzaki et al. | 395/375 |
| 5,222,244 | 6/1993 | Carbine et al. | 395/800 |
| 5,233,694 | 8/1993 | Hotta et al. | 395/375 |
| 5,293,592 | 3/1994 | Fu et al. | 395/375 |
| 5,371,864 | 12/1994 | Chuang | 395/375 |

OTHER PUBLICATIONS

Popescu, et al., "The Metaflow Architecture", *IEEE*, 1991, pp.10–13 and pp. 63–73.

*Primary Examiner*—Robert B. Harrell
*Attorney, Agent, or Firm*—Blakely, Sokoloff, Taylor & Zafman

[57] ABSTRACT

A circuit and method for supplying a block of instruction code to an instruction buffer for an instruction decoder. A block of instruction code is fetched and input through a buffer input. A first instruction buffer and a second instruction buffer are coupled to the buffer input to store the block of instruction code. The output of the instruction buffers and a bypass bus coupled to the buffer input are input into an instruction buffer multiplexer. The instruction buffer multiplexer selects among the three inputs and outputs two blocks of instruction code to a rotator. The rotator receives an input pointer indicative of an initial byte. The rotator outputs a block of instruction code beginning at the initial byte to an instruction decoder.

3 Claims, 12 Drawing Sheets

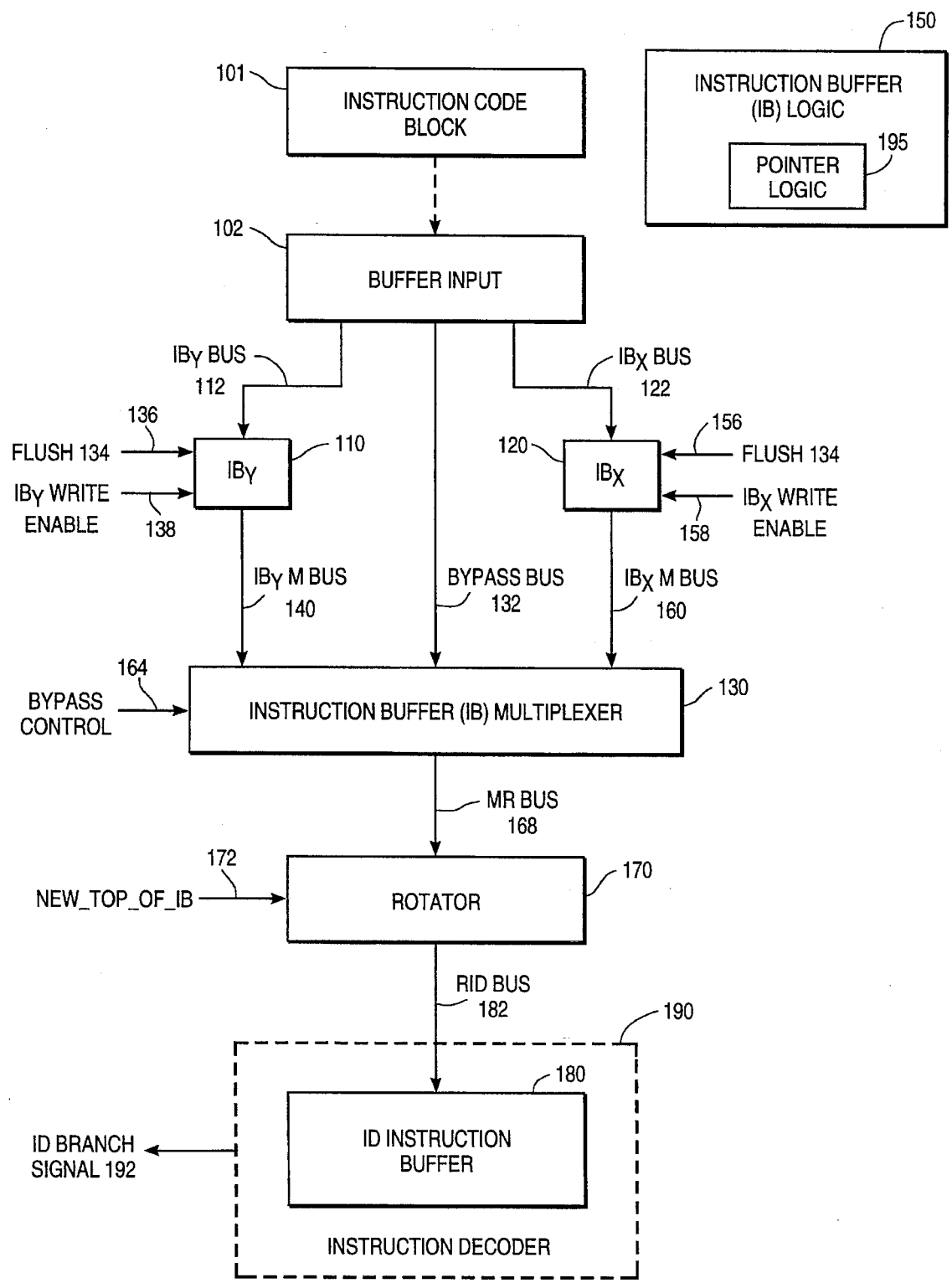
FIG_1

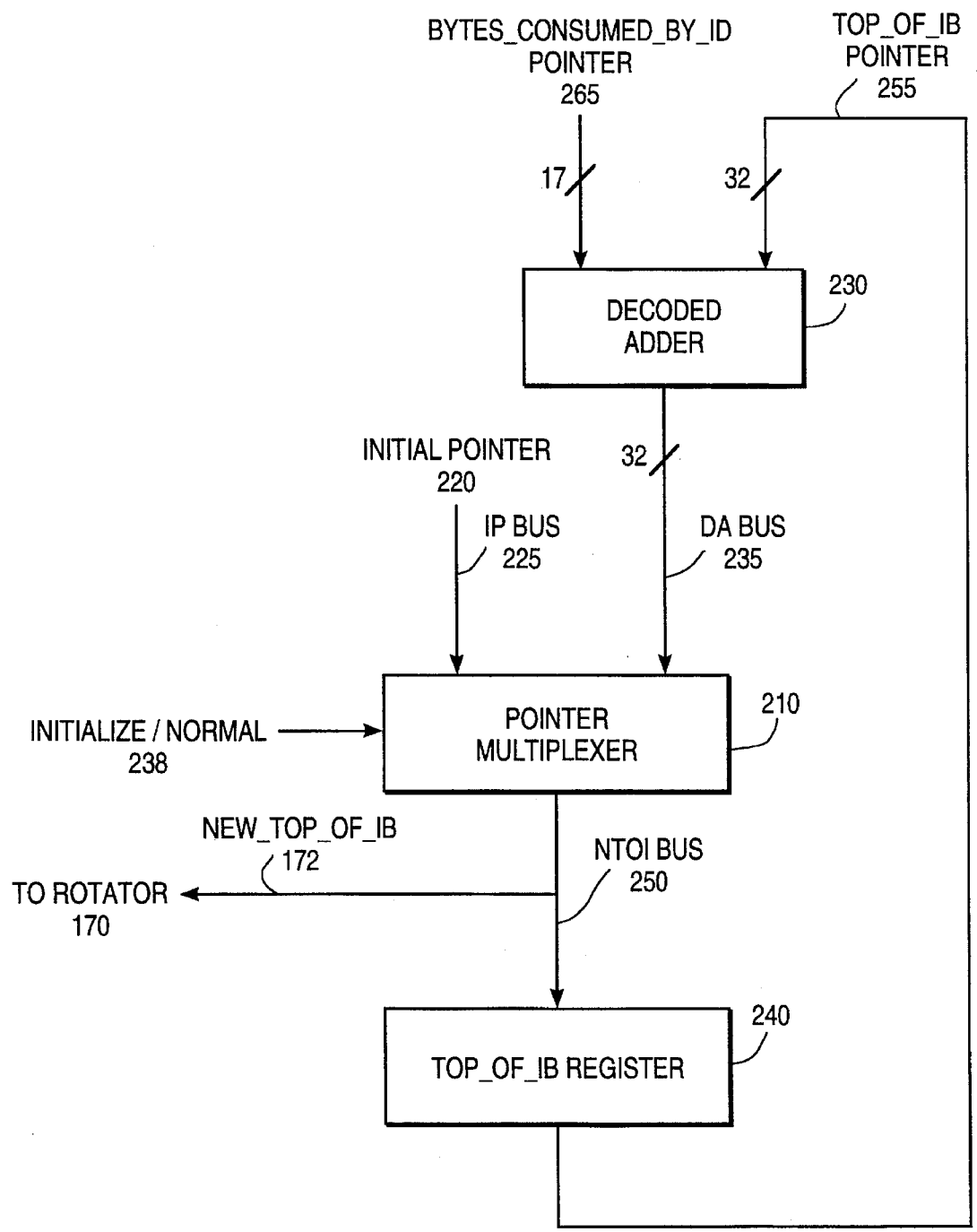
FIG_2

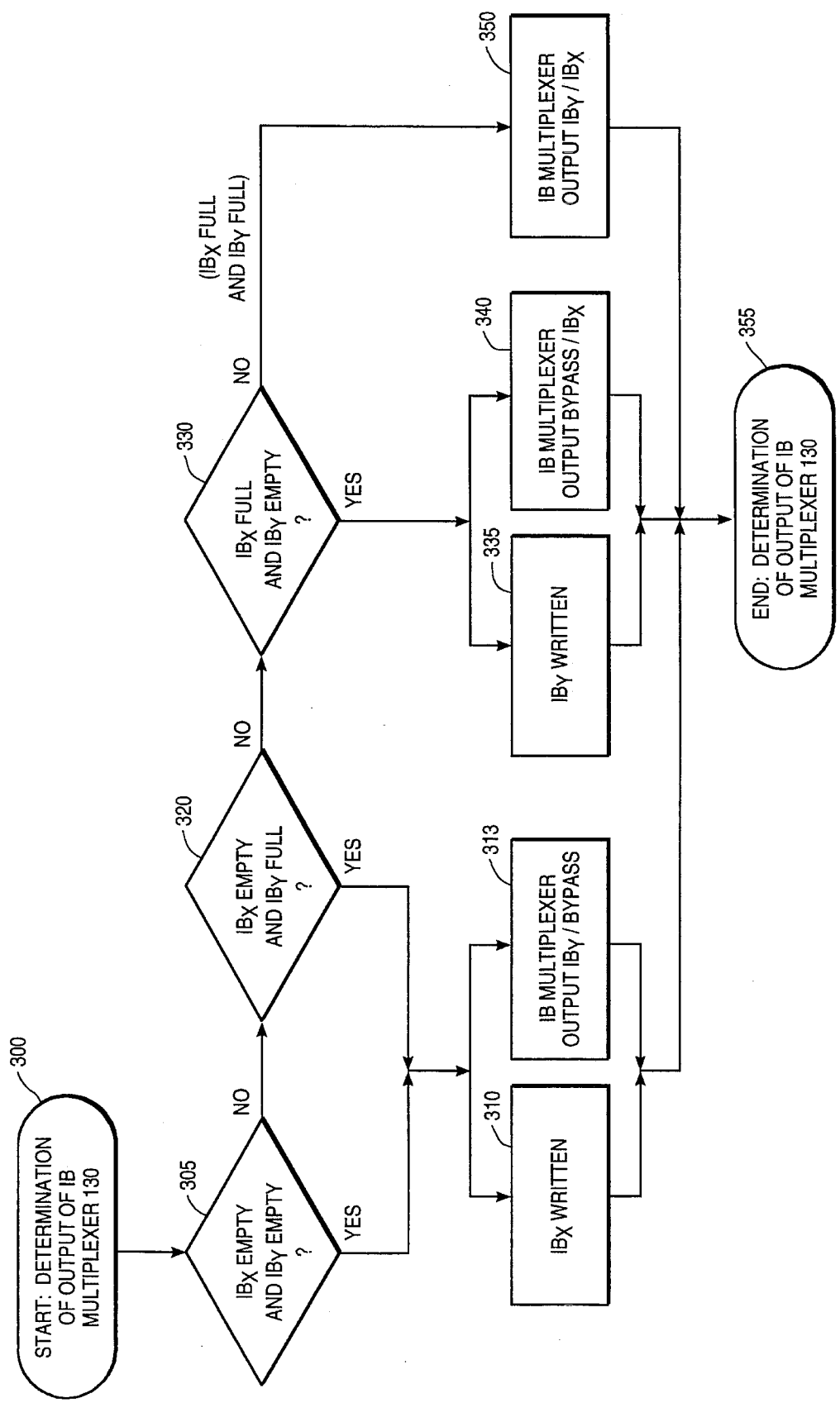
FIG_3

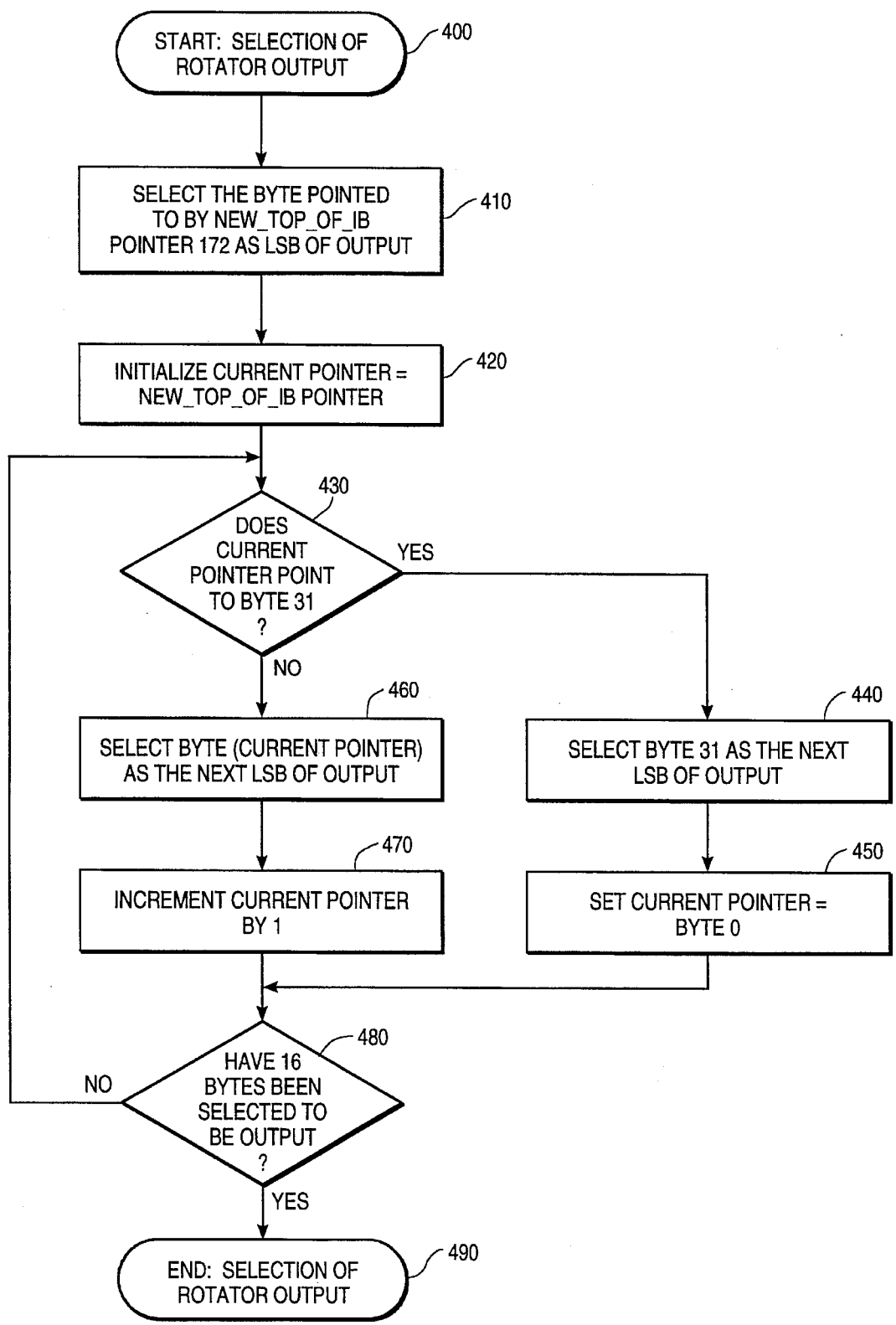
FIG_4

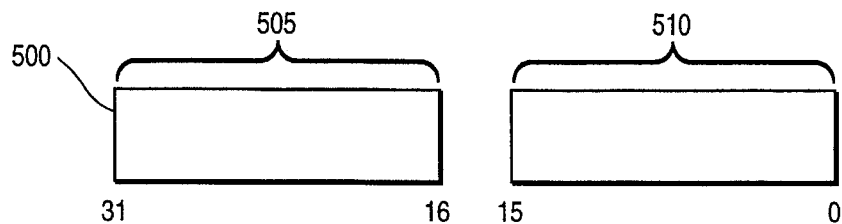
FIG_5A
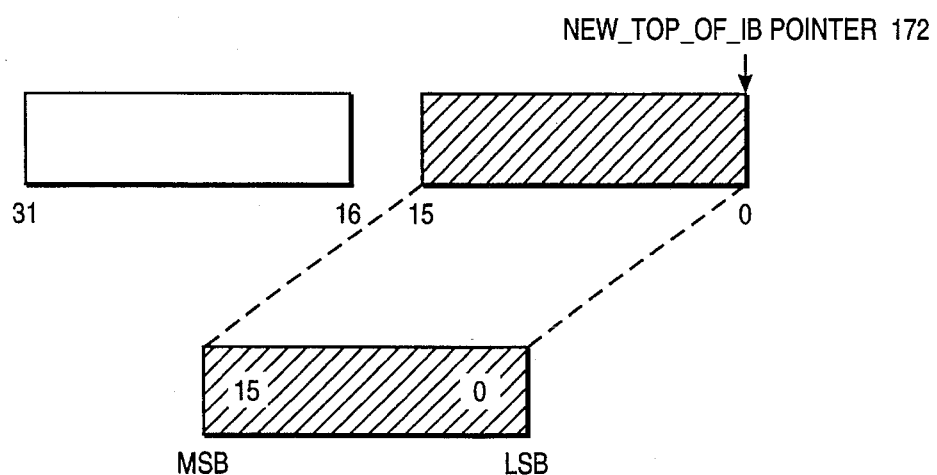
FIG_5B
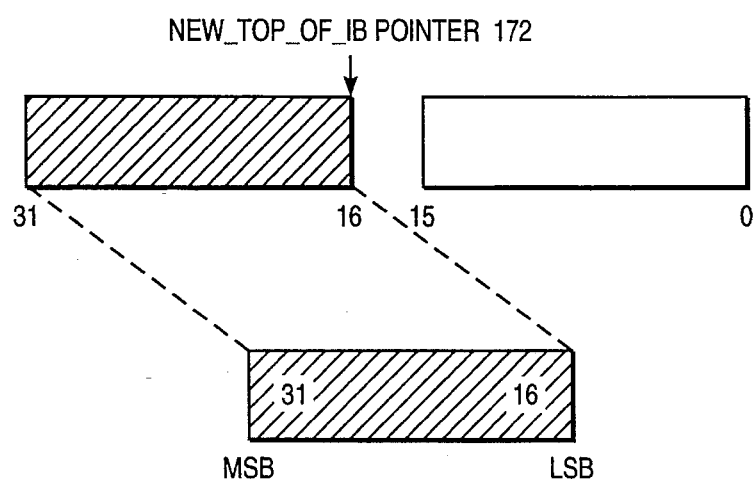
FIG_5C

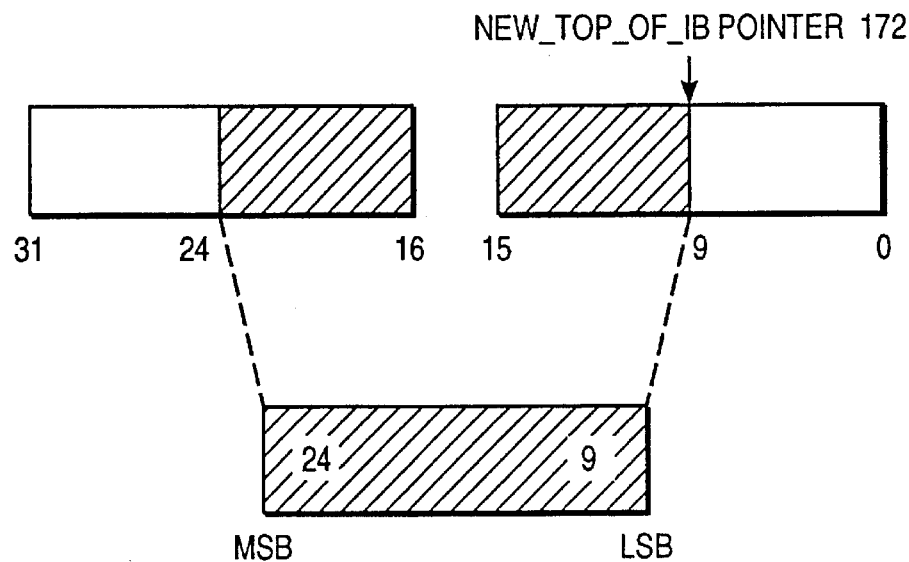
FIG_5D
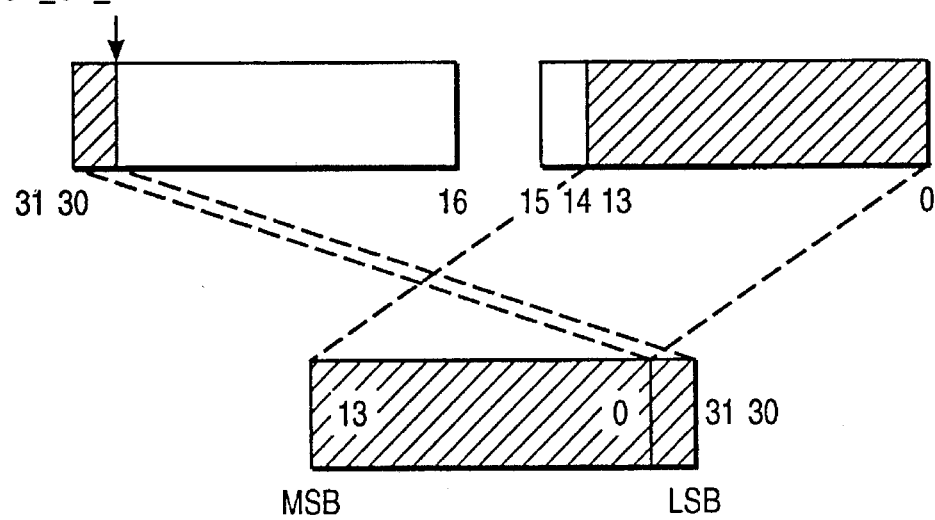
FIG_5E

BYTES_CONSUMED_BY_ID　　TOP_OF_IB
　　POINTER 265　　　　　POINTER 255

BIT LINE　　　　　　BIT LINE

```
        (  0    AND      0 )
OR      (  1    AND     31 )
OR      (  2    AND     30 )
OR      (  3    AND     29 )
OR      (  4    AND     28 )
OR      (  5    AND     27 )
OR      (  6    AND     26 )
OR      (  7    AND     25 )
OR      (  8    AND     24 )
OR      (  9    AND     23 )
OR      ( 10    AND     22 )
OR      ( 11    AND     21 )
OR      ( 12    AND     20 )
OR      ( 13    AND     19 )
OR      ( 14    AND     18 )
OR      ( 15    AND     17 )
OR      ( 16    AND     16 ) → DECODED
                              ADDER 230
                              BIT LINE 0
```

FIG_6

BYTES_CONSUMED_BY_ID　　TOP_OF_IB
　　POINTER 265　　　　　POINTER 255

BIT LINE　　　　　　BIT LINE

```
        (  0    AND      1 )
OR      (  1    AND      0 )
OR      (  2    AND     31 )
OR      (  3    AND     30 )
OR      (  4    AND     29 )
OR      (  5    AND     28 )
OR      (  6    AND     27 )
OR      (  7    AND     26 )
OR      (  8    AND     25 )
OR      (  9    AND     24 )
OR      ( 10    AND     23 )
OR      ( 11    AND     22 )
OR      ( 12    AND     21 )
OR      ( 13    AND     20 )
OR      ( 14    AND     19 )
OR      ( 15    AND     18 )
OR      ( 16    AND     17 ) → DECODED
                              ADDER 230
                              BIT LINE 1
```

FIG_7

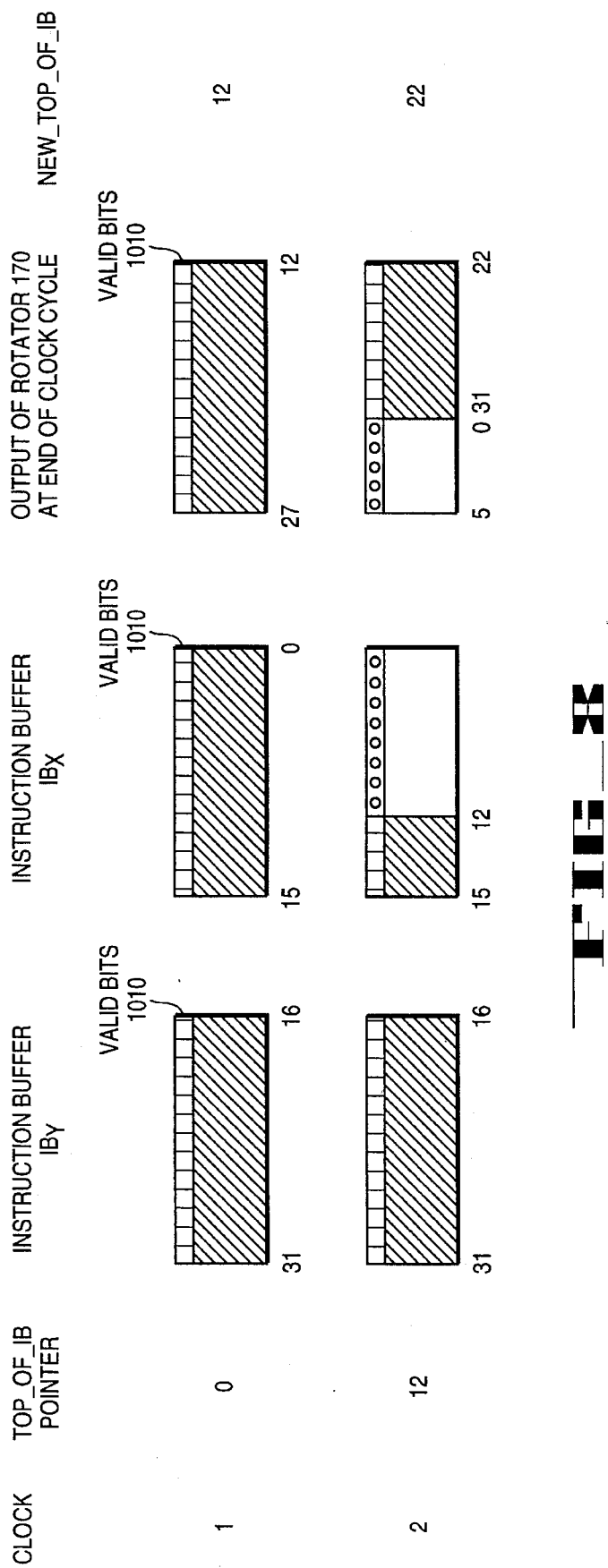
FIG. X

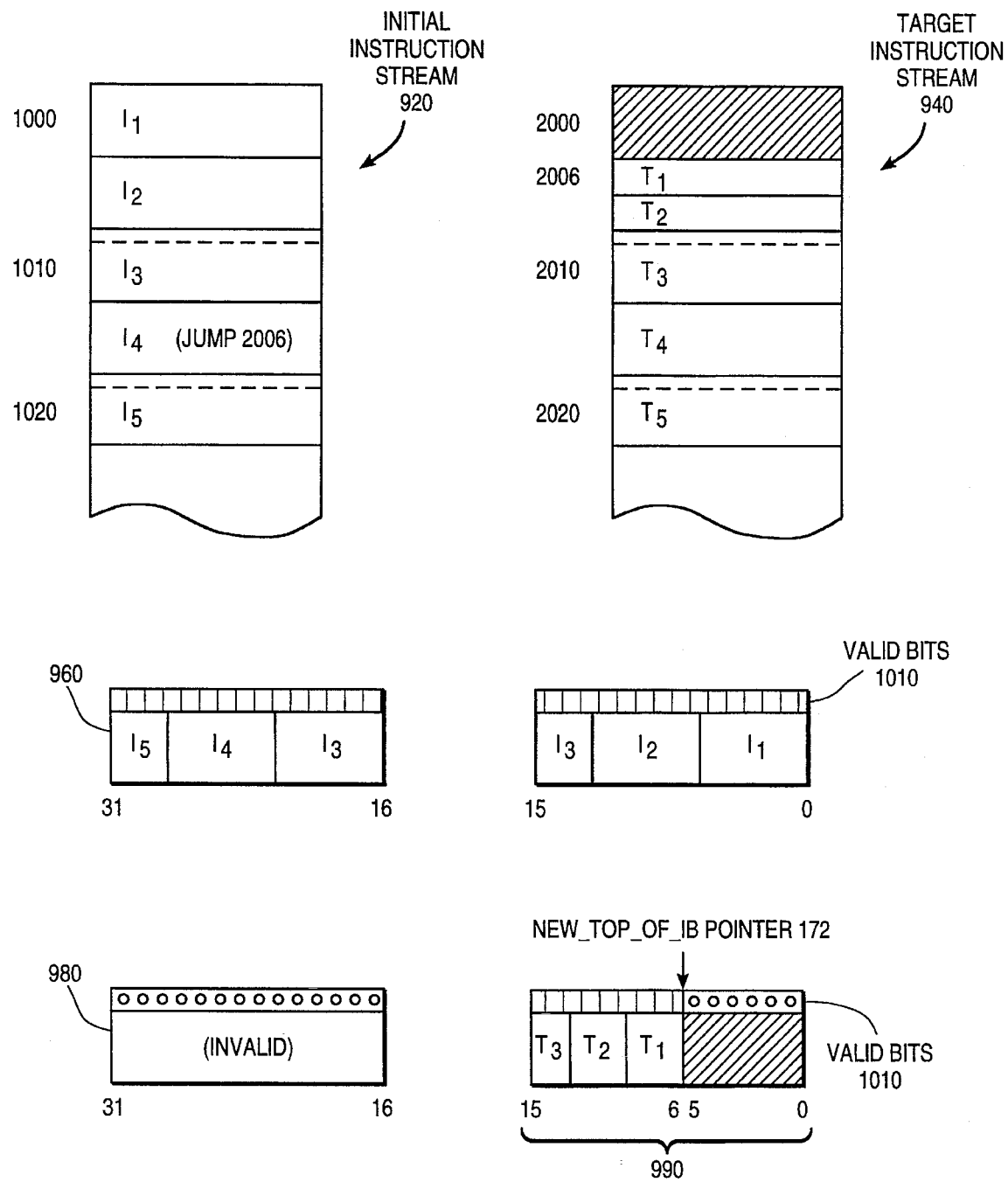
FIG_9

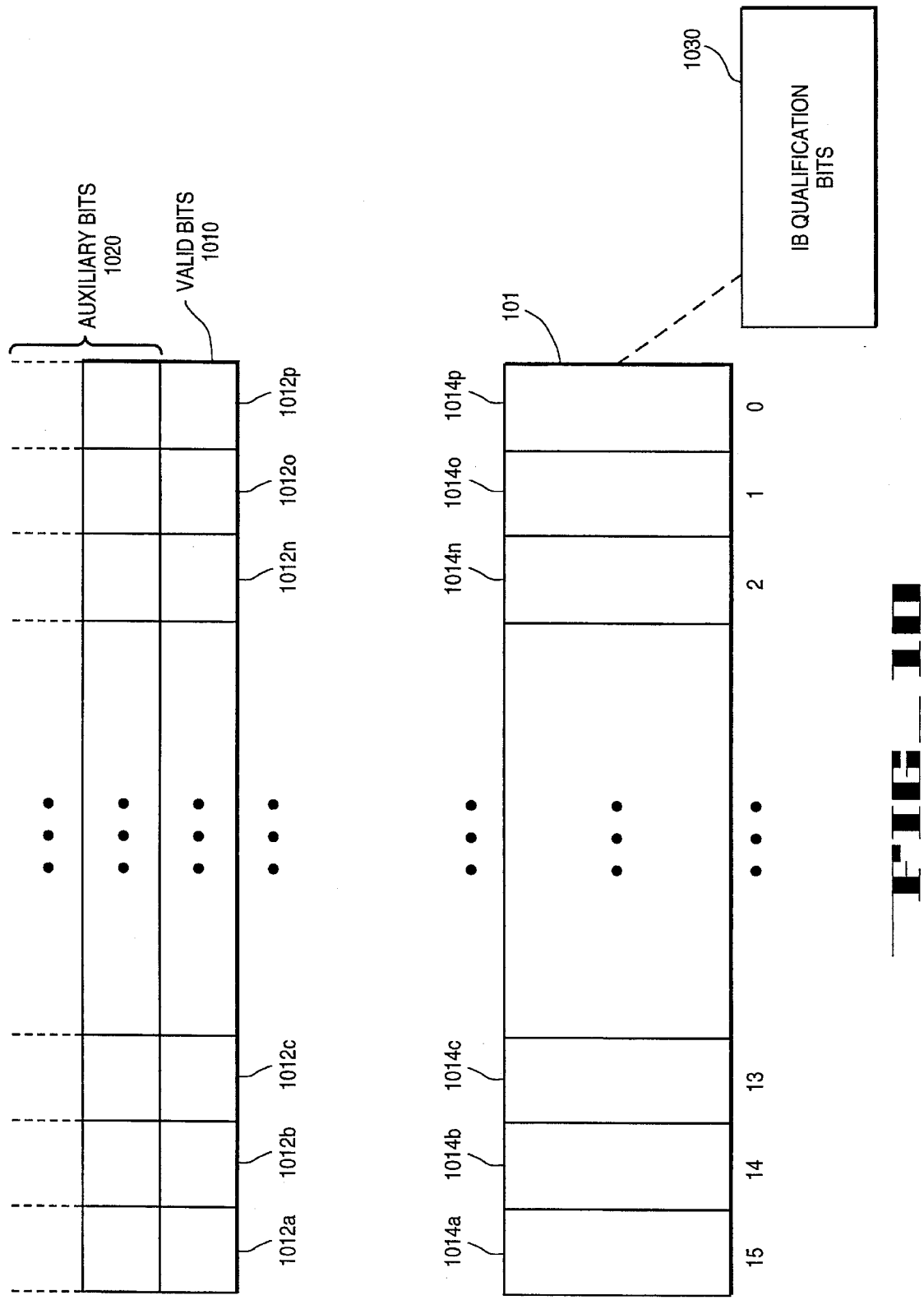
FIG_10

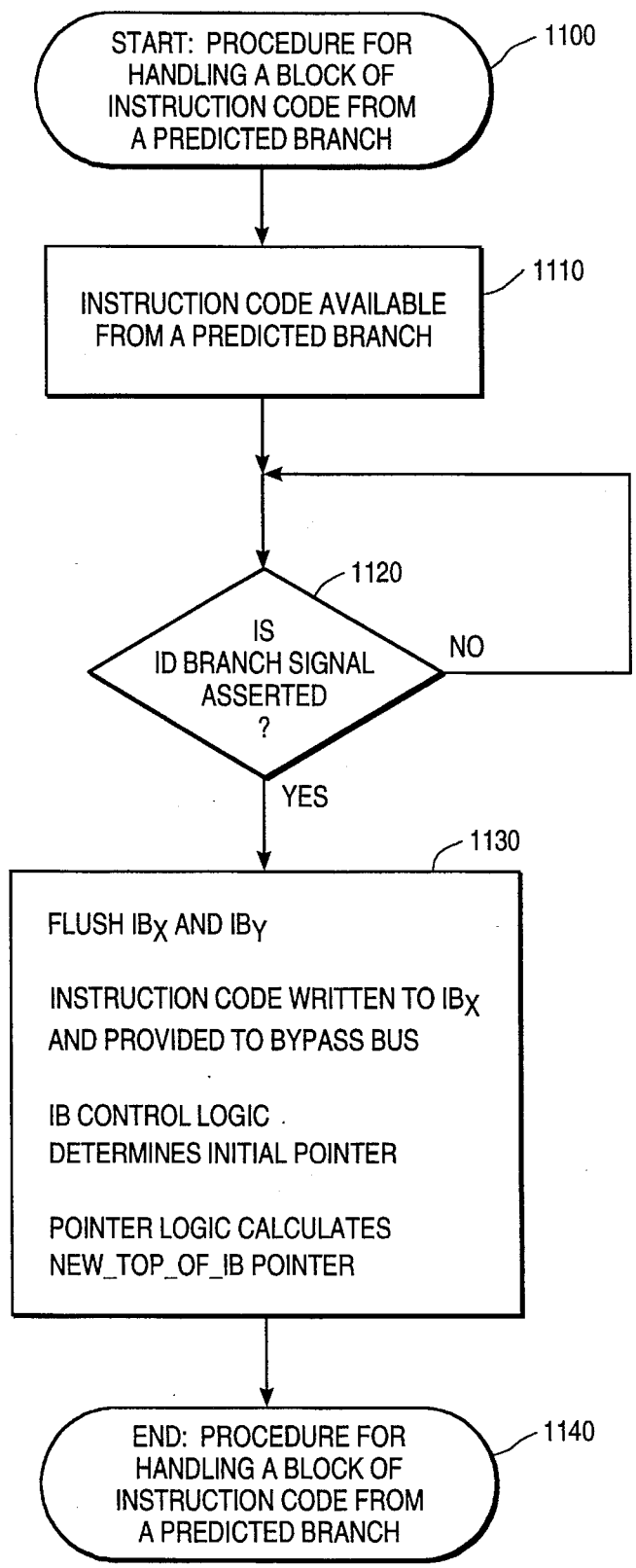
FIG_11

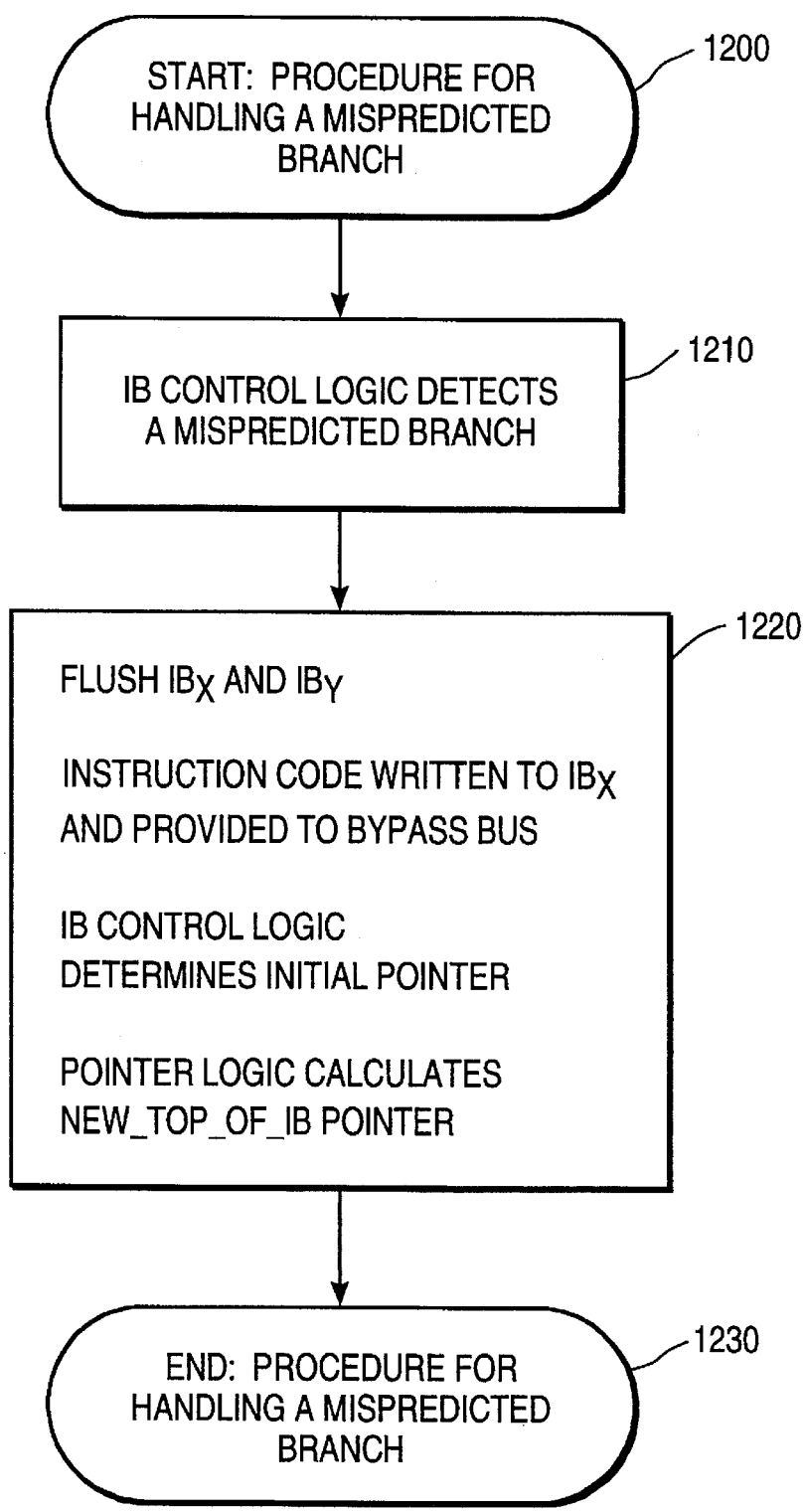
FIG_12

METHOD FOR HANDLING INSTRUCTIONS FROM A BRANCH PRIOR TO INSTRUCTION DECODING IN A COMPUTER WHICH EXECUTES VARIABLE-LENGTH INSTRUCTIONS

Cross-reference is made to the following commonly assigned copending patent applications: Ser. No. 204,862, entitled, still pending, "A Method and Apparatus for Aligning an Instruction Boundary in Variable Length Macroinstructions with an Instruction Buffer", filed Mar. 1, 1994, by Brown et al., Ser. No. 204,862, still pending, entitled "A Decode for Single Cycle Decoding of Single Prefixes in Variable Length Instructions", filed Mar. 1, 1994, by Brown et al., and Ser. No. 204,601, entitled "A Method for Steering Multiple Variable Length Instructions from an Instruction Buffer to Multiple Decoders", filed Mar. 1, 1994, now abandoned, by Brown et al., which are incorporated by reference herein.

BACKGROUND OF THE INVENTION

1. Field of the Invention

The present invention relates to an instruction fetch and rotate mechanism in a microprocessor that executes variable-length instructions.

2. Description of Related Art

Computers process information by executing a sequence of instructions, which may be supplied from a computer program written in a particular format and sequence designed to direct the computer to operate a particular sequence of operations. Most computer programs are written in high level languages such as FORTRAN or "C" which are not directly executable by the computer processor. These high level instructions are translated into instructions, termed "macroinstructions" herein, having a format that can be decoded and executed within the processor.

Macroinstructions are conventionally stored in data blocks having a predefined length in a computer memory element, such as main memory or an instruction cache. Macroinstructions are fetched from the memory elements and then supplied to a decoder, in which each macroinstruction is decoded into one or more microinstructions having a form that is executable by an execution unit in the processor.

Pipelined processors define multiple stages for processing a macroinstruction. These stages are defined so that a typical instruction can complete processing in one cycle and then move on to the next stage in the next cycle. In order to obtain maximum efficiency from a pipelined processing path, the decoder and subsequent execution units must process multiple instructions every cycle. Accordingly, it is advantageous for the fetching circuits to supply multiple new macroinstructions every cycle. In order to supply multiple instructions per clock, a block of instruction code at the most likely subsequent execution location is fetched and buffered so that it can be supplied to an instruction decoder when requested.

If sufficient time and buffer space is available, additional instruction blocks can be buffered, dependent upon the ability to predict the subsequent execution locations. In the event of a mispredicted branch or other change of instruction flow, the instruction code in the buffers will no longer be useful. Additional clock cycles are then required to redirect fetching operations and retrieve the instruction code from memory. Accordingly, it would be advantageous to have a mechanism that can quickly supply the newly fetched instruction code from memory, thereby reducing (or eliminating) the additional clock cycles needed to switch between instruction streams.

Operations to fetch, buffer, and rotate multiple macroinstructions every cycle can be complicated by the format of the macroinstructions, particularly if those macroinstructions have a variable length. One example of a popular instruction set that allows variable length instructions is the INTEL instruction set, in which instruction lengths can vary from one to fifteen bytes. With variable length instructions, the location of instruction boundaries (i.e., the location between adjoining macroinstructions in the instruction code) in a block of instruction code is difficult to determine.

It would be advantageous to provide a fetch and rotate mechanism that can supply a block of instruction code aligned with an instruction boundary in every cycle. Such a mechanism would be useful to supply multiple variable length instructions to an instruction buffer, from which they can be steered to a multiple instruction decoder. Particularly, such a fetch and rotate mechanism would be useful for a multiple instruction decoder that can issue multiple micro-operations to a high performance execution unit that executes more than one micro-operation per cycle.

SUMMARY OF THE INVENTION

A circuit and method is described herein for fetching and rotating macroinstructions to an instruction buffer for an instruction decoder that receives and decodes multiple macroinstructions in parallel. The circuit and method is particularly useful for variable length instructions such as the instructions in the INTEL instruction set. The circuit and method is also useful for microprocessors which do branch prediction.

In the described embodiment, the circuit includes a buffer input which allows the input of blocks of instruction code. The buffer input is coupled to a first and second instruction buffer, each of which can store a block of instruction code. The buffer input is also coupled to a bypass bus. The instruction buffers and bypass bus are input into an instruction buffer (IB) multiplexer which selects among the three inputs. A rotator is connected to the output of the IB multiplexer. The rotator outputs a block of instruction code responsive to a new_top_of_ib pointer. The new_top_of_ib pointer is selected so that the output block of instruction code is always aligned on an instruction boundary. The circuit also contains control logic which controls the input and output of the instruction buffers, the IB multiplexer, and the rotator. The control logic includes pointer logic for selecting the new_top_of_ib pointer, previously mentioned. The output of the rotator is sent to an instruction decoder.

In the described embodiment, the pointer logic includes a decoded adder coupled to the new_top_of_ib pointer via a pointer multiplexer. The decoded adder is used in the pointer logic to increase computation speed and to meet the critical timing constraints of the circuit. Valid bits and auxiliary bits are associated with each byte of each block of instruction code input into the circuit. Instruction buffer (IB) qualification bits are associated with each block of instruction code input into the circuit. These valid bits, auxiliary bits, and IB qualification bits are passed through the circuit to the instruction decoder along with the instructions of the original block of instruction code.

In the described embodiment, the instruction buffers are controlled such that at any time there is only one instruction stream in them which is useful for handling branch predictions, mispredictions, and other changes of instruction flow. Allowing only one instruction stream permits a simplified instruction decoder design. Only after the instruction decoder has finished decoding instructions from an initial instruction stream will it accept the instructions from a target instruction stream.

BRIEF DESCRIPTION OF THE DRAWINGS

FIG. 1 is block diagram of the instruction distributing circuit.

FIG. 2 illustrates pointer logic 195 in more detail in block diagram form.

FIG. 3 is a flowchart for determining the output of the IB multiplexer 130 depending on whether instruction buffers IBy 110 and IBx 120 are empty or full.

FIG. 4 is a flowchart for selecting the output of the rotator 170 depending upon the new_top_of_ib pointer 172.

FIG. 5A shows a thirty-two byte block representation 500 of the output of the IB multiplexer 130, which is also the input of the rotator 170.

FIG. 5B shows a thirty-two byte block representation 500 of the input of the rotator 170 and the resulting output of the rotator 170 corresponding to a new_top_of_ib pointer 172 value of zero.

FIG. 5C shows a thirty-two byte block representation 500 of the input of the rotator 170 and the resulting output of the rotator 170 corresponding to a new_top_of_ib pointer 172 value of sixteen.

FIG. 5D shows a thirty-two byte block representation 500 of the input of the rotator 170 and the resulting output of the rotator 170 corresponding to a new_top_of_ib pointer 172 value of nine.

FIG. 5E shows a thirty-two byte block representation 500 of the input of the rotator 170 and the resulting output of the rotator 170 corresponding to a new_top_of_ib pointer 172 value of thirty.

FIG. 6 shows the logical equation for bit line zero of the decoded adder 230.

FIG. 7 shows the logical equation for bit line one of the decoded adder 230.

FIG. 8 depicts a clock by clock example of some typical operations and values which would result in the instruction buffers IBy 110 and IBx 120, the top_of_ib pointer 255, the new_top_of_ib pointer 172, and the output of the rotator 170.

FIG. 9 displays sample code which includes a jump instruction.

FIG. 10 shows the input block of instruction code 101 and its associated valid bits 1010, its associated auxiliary bits 1020, and its associated instruction buffer (IB) qualification bits 1030.

FIG. 11 shows the procedure for handling a block of instruction code 101 from a predicted branch.

FIG. 12 shows the procedure for handling a mispredicted branch.

DETAILED DESCRIPTION OF THE PREFERRED EMBODIMENT

FIGS. 1 through 12 of the drawings disclose various embodiments of the present invention for purposes of illustration only. One skilled in the art will readily recognize from the following discussion that alternative embodiments of the structures and methods illustrated herein may be employed without departing from the principles of the invention. The following description may include specific numbers and quantities associated with the circuit and methods described herein. It should be apparent to one skilled in the art that these numbers and quantities are utilized herein for illustrative purposes. For example, the number of bits in a particular field can vary between embodiments.

FIG. 1 is a block diagram of the instruction distributing circuit. In this system, an input block of an instruction code 101 supplied by a conventional instruction fetch unit is input via a buffer input 102. The buffer input 102 is coupled to an instruction buffer IBy 110 via an IBy bus 112, the buffer input 102 is coupled to an instruction buffer IBx 120 via an IBx bus 122, and the buffer input 102 is coupled to an instruction buffer (IB) multiplexer 130 via a bypass bus 132. Both the input block of the instruction code 101 and the buffer input 102 are sixteen bytes wide in the implemented embodiment. The IBy bus 112, the IBx bus 122, and the bypass bus 132 are also sixteen bytes wide.

The instruction buffer IBy 110 is coupled to receive the input block of the instruction code 101 via the IBy bus 112. The instruction buffer IBy 110 is sixteen bytes wide. The instruction buffer IBy 110 is coupled receive to a flush signal 134 via an input line 136. The instruction buffer IBy 110 is also coupled to an IBy write enable signal 138. The instruction buffer IBy 110 provides a sixteen byte output to the IB multiplexer 130 via an IByM bus 140.

The flush signal 134 and the IBy write enable signal 138, which are coupled into the instruction buffer IBy 110 are provided by an instruction buffer (IB) control logic 150. When the IBy write enable signal 138 is asserted by the IB control logic 150, the input block of the instruction code 101 is written into the instruction block IBy 110. When the flush signal 134 is asserted to the instruction buffer IBy 110 via the input line 136, the instruction block IBy 110 is flushed of its contents.

The instruction buffer IBx 120 is coupled to receive the input block of the instruction code 101 via the IBx bus 122. The instruction buffer IBx 120 is sixteen bytes wide. The instruction buffer IBx 120 is coupled to receive the flush signal 134 via an input line 156. The instruction buffer IBx 120 is also coupled to an IBx write enable signal 158. The instruction buffer IBx 120 provides a sixteen byte output to the IB multiplexer 130 via an IBxM bus 160.

The flush signal 134 and the IBx write enable signal 158 are coupled to and provided by the IB control logic 150. When the IBx write enable signal 138 is asserted by the IB control logic 150, the input block of the instruction code 101 is written into the instruction block IBx 120. When the flush signal 134 is asserted to the instruction buffer IBx 120 via the input line 156, the instruction block IBx 120 is flushed of its contents.

The IB multiplexer 130 is coupled to the sixteen byte input buses IByM bus 140, bypass bus 132, and IBxM bus 160. A bypass control signal 164 is coupled to the IB multiplexer 130. The bypass control signal 164 selects the output of the IB multiplexer 130. The output of the IB multiplexer 130 is thirty-two bytes wide. A MR bus 168 couples the IB multiplexer 130 with a rotator 170. The MR bus 168 is thirty-two bytes wide.

The rotator 170 is comprised of control logic and multiplexers to supply a sixteen byte output from an input of up to thirty-two bytes. The rotator 170 receives up to thirty-two bytes of input from the IB multiplexer 130. The rotator 170 is coupled to receive a new_top_of_ib pointer 172. The new_top_of_ib pointer 172 is used by the rotator 170 to indicate the least significant byte to output from the rotator 170. The output of the rotator 170 is coupled to an instruction decoder (ID) instruction buffer 180 via a RID bus 182. The output of the rotator 170 is sixteen bytes wide.

The ID instruction buffer 180 is considered herein as an element of an instruction decoder 190. The instruction decoder 190 outputs an ID branch signal 192 indicative of a change in instruction stream from a first, or initial, instruction stream to a target instruction stream. The ID branch signal 192 is coupled to the IB control logic 150.

In a preferred embodiment, the instruction decoder 190 can handle instructions of variable length. Multiple instruction decoders may also be implemented to facilitate instruction processing.

The IB control logic 150 is coupled to the flush signal 134, the IBy write enable 138, the IBx write enable 158, the bypass control signal 164, the new_top_of_ib pointer 172, and the ID branch signal 192. The IB control logic 150 includes a pointer logic 195, which is coupled to the rotator 170 via the new_top_of_ib pointer 172.

Reference is now made to FIG. 2 which illustrates the pointer logic 195 in more detail in block diagram form.

A pointer multiplexer 210 is coupled to an initial pointer 220 via an IP bus 225. The pointer multiplexer 210 is coupled to the output of a decoded adder 230 via a DA bus 235. Both the IP bus 225 and the DA bus 235 are thirty-two bits wide in the implemented embodiment. The pointer multiplexer 210 is also coupled to an initialize/normal signal 238. The initialize/normal signal 238 selects whether the initial pointer 220 or the output of the decoded adder 230 is output from the pointer multiplexer 210. The output of the pointer multiplexer 210 is coupled to a top_of_ib register 240 via a NTOI bus 250. The NTOI bus 250 is coupled to the new_top_of_ib pointer 172, which was discussed previously with reference to FIG. 1.

The top_of_ib register 240 is coupled to the decoded adder 230 via a top_of_ib pointer 255, which is thirty-two bits wide. A bytes_consumed_by_ID pointer 265 is coupled into the decoded adder 230. The bytes_consumed_by_ID pointer 265 is seventeen bits wide. The bytes_consumed_by_ID pointer 265, the initialize/normal signal 238, and the initial pointer 220 are provided by the IB control logic 150.

In the implemented embodiment, a decoded adder 230 is used to add the bytes_consumed_by_ID pointer 265 and the top_of_ib pointer 255 and to supply the decoded result to the pointer multiplexer 210. Because of the tight timing constraint in adding the top_of_ib pointer 255 with the bytes_consumed_by_ID pointer 265 to provide the decoded result to the rotator 170 within the same clock cycle, the decoded adder 230, which is faster than an encoded adder, is employed since an encode-add-decode design using conventional circuitry is not fast enough.

The decoded adder 230 requires both its inputs and outputs to be decoded signals. These decoded signals have a plurality of bit lines. At any one time only one bit line of the decoded signal is asserted. For example, the bytes_consumed_by_ID pointer 265 is a decoded input having seventeen bit lines ranging from bit line zero to bit line sixteen. At any time, only one bit line is asserted which indicates whether zero to sixteen bytes are consumed by the instruction decoder. Similarly the top_of_ib pointer 255 has thirty-two bit lines. At any time, only one bit line is asserted.

Reference is now made to FIG. 6 which shows the logical equation for bit line zero of the decoded adder 230. For example, bit line zero of the decoded adder 230 will be asserted if bit line zero of the bytes_consumed_by_ID 265 and bit line zero of the top_of_ib pointer 255 are asserted. Alternatively, bit line zero of the decoded adder 230 will be asserted if bit line one of the bytes_consumed_by_ID 265 and bit line thirty-one of the top_of_ib pointer 255 are asserted. Bit line zero of the decoded adder 230 is also asserted if any of the other listed combinations of bit lines of the bytes_consumed_by_ID 265 and the top_of_ib pointer 255 are asserted.

Similarly, FIG. 7 shows the logical equation for bit line one of the decoded adder 230. For example, bit line one of the decoded adder 230 will be asserted if bit line zero of the bytes_consumed_by_ID 265 and bit line one of the top_of_ib pointer 255 are asserted. Alternatively, bit line one of the decoded adder 230 will be asserted if bit line one of the bytes_consumed_by_ID 265 and bit line zero of the top_of_ib pointer 255 are asserted. Bit line one of the decoded adder 230 is also asserted if any of the other listed combinations of bit lines of the bytes_consumed_by_ID 265 and the top_of_ib pointer 255 are asserted.

Reference is now made to FIG. 10 which shows the input block of the instruction code 101 and its associated valid bits 1010, its associated instruction buffer (IB) qualification bits 1030, and its associated auxiliary bits 1020. In the current embodiment, a valid bit $1012a-p$ is associated with each byte $1014a-p$ of the input block of instruction code 101. The valid bits, illustrated collectively at 1010, are set for each byte $1014a-p$ which is valid and is cleared for each byte $1014a-p$ which is not valid. As each byte $1014a-p$ of the input block of instruction code 101 is passed along to the instruction buffers IBy 110 and IBx 120, the IB multiplexer 130, the rotator 170, and to the ID instruction buffer 180, the associated valid bits $1012a-p$ are also passed along.

Each byte $1014a-p$ of the input block of instruction code 101 also has auxiliary bits 1020 associated therewith. These auxiliary bits 1020 may include an opcode marker indicating the first byte of an instruction, an end marker indicating the last byte of an instruction, a breakpoint marker for indicating that a breakpoint has been set, and/or prediction markers for indicating whether a branch is predicted to be taken. These auxiliary bits 1020 are also passed through to the instruction buffers IBy 110 and IBx 120, the IB multiplexer 130, the rotator 170, and to the ID instruction buffer 180, as each byte $1014a-p$ of the input block of instruction code 101 is passed along.

Each input block of instruction code 101 also has instruction buffer (IB) qualification bits 1030 associated therewith. The IB qualification bits 1030 may include addressing information and branch prediction information. The IB qualification 1030 are passed through to the ID instruction buffer 180, as the input block of instruction code 101 is passed along.

Returning to FIG. 1, when the block of the instruction code 101 is input via the buffer input 102, there are four possible execution scenarios that can be taken depending upon whether the instruction buffers IBy 110 and IBx 120 have instruction code already stored within. If any valid instruction code is stored within an instruction buffer, the instruction buffer is said to be full, whether or not all bytes are valid. If no instruction code is stored within an instruction buffer, the instruction buffer is said to be empty.

FIG. 3 is a flowchart for determining the output of the IB multiplexer 130 depending on whether the instruction buffers IBy 110 and IBx 120 are empty or full. Starting from a flowchart block 300, it is determined whether the instruction buffers IBy 110 and IBx 120 are empty or full. At a decision block 305, if the instruction buffers IBy 110 and IBx 120 are both empty then operation moves concurrently to decision boxes 310 and 315. The decision box 310 illustrates that the block of the instruction code 101 is written to the instruction buffer IBx 120. The decision box 315 illustrates that the output of the IB multiplexer 130 is made up of the instruction buffer IBy 110 and the bypass bus 132. Since the output of the IB multiplexer 130 is thirty-two bytes wide, the instruction buffer IBy 110 is output on the upper sixteen bytes and the bypass bus 132 is output on the lower sixteen bytes.

However, if from the decision box 305, it is determined that the instruction buffers IBy 110 and IBx 120 are not both empty, then operation moves to a decision box 320. At the decision block 320, if the instruction buffer IBy 110 is full and the instruction buffer IBx 120 is empty then operation moves concurrently to the decision boxes 310 and 315. The decision box 310 illustrates that the block of the instruction code 101 is written to the instruction buffer IBx 120. The decision box 315 illustrates that the output of the IB multiplexer 130 is made up of the instruction buffer IBy 110 and the bypass bus 132. The instruction buffer IBy 110 is output on the upper sixteen bytes and the bypass bus 132 is output on the lower sixteen bytes.

However, if from the decision box 320, it is determined that the condition that instruction buffer IBx is empty and instruction buffer IBy is full is not met, then operation moves to a decision box 330. At the decision block 330, if the instruction buffer IBy 110 is empty and the instruction buffer IBx 120 is full then operation moves concurrently to decision boxes 335 and 340. The decision box 335 illustrates that the block of the instruction code 101 is written to the instruction buffer IBy 110. The decision box 340 illustrates that the output of the IB multiplexer 130 is made up of the bypass bus 132 and the instruction buffer IBx 120. The bypass bus 132 is output on the upper sixteen bytes and the instruction buffer IBx 120 is output on the lower sixteen bytes.

However, if from the decision box 330, it is determined that the condition that instruction buffer IBx is full and instruction buffer IBy is empty is not met, then operation moves to an operation box 350. The operation box 350 illustrates that the output of the IB multiplexer 130 is made up of the instruction buffer IBy 110 and the instruction buffer IBx 120. The instruction buffer IBy 110 is output on the upper sixteen bytes and the instruction buffer IBx 120 is output on the lower sixteen bytes.

Thus, the output of the IB multiplexer 130 is comprised of an upper sixteen bytes and a lower sixteen bytes. The upper sixteen bytes come from either the instruction buffer IBy 110 or the bypass bus 132, and the lower sixteen bytes come from either the instruction buffer IBx 120 or the bypass bus 132. All of the operation blocks 310, 315, 335, 340, and 350 are coupled to a termination block 355.

Reference is now made to FIG. 5A which shows a thirty-two byte block representation 500 of the output of IB multiplexer 130. An upper block of sixteen bytes 505 range from byte thirty-one to byte sixteen. A lower block of sixteen bytes 510 range from byte fifteen to byte zero. The output of the IB multiplexer 130 is also the input to the rotator 170.

Reference is now made to FIG. 4 which is a flowchart for selecting the output of the rotator 170 depending upon the new_top_of_ib pointer 172. The selection of the output of the rotator 170 is described in an iterative form for illustrative purposes. It should be noted that the circuit executes all of the operations of FIG. 4 within one clock.

Starting from a flowchart block 400, the selection of the output of the rotator 170 begins. From the flowchart block 400, operation moves to an operation block 410. At the operation block 410, the byte of the thirty-two byte block 500 (FIG. 5A) pointed to by the new_top_of_ib signal 172 (FIG. 1) is selected as the least significant byte (LSB) of the output of the rotator 170. From the operation block 410, operation continues at an operation block 420. The operation block 420 illustrates that a temporary pointer, herein called current pointer, is used to keep track of the current byte which is being selected for the output of the rotator 170. The operation block 420 shows the current pointer being initialized to the new_top_of_ib pointer 172. From operation block 420, operation moves to a decision block 430.

If from the decision block 430, the current pointer points to byte thirty-one of the thirty-two byte block 500 (FIG. 5A), then operation moves to an operation block 440. The operation block 440 illustrates that byte thirty-one of the thirty-two byte block 500 is selected as the next least significant byte of the output of the rotator 170. The next least significant byte is herein defined as the byte corresponding to the index of the previous byte selected to be output plus one. Thus, if the previous byte selected to be output was byte zero, then the next least significant byte (LSB) is byte one. If byte one was the previous byte selected to be output, then the next LSB is byte two, and so forth. From the operation box 440, operation moves to an operation box 450. The operation box 450 illustrates that the current pointer is set to point to byte zero of the thirty-two byte block 500.

However, if from the decision block 430, the current pointer does not point to byte thirty-one of the thirty-two byte block 500 (FIG. 5A), then operation moves to an operation block 460. The operation block 460 illustrates that the byte selected by the current pointer of the thirty-two byte block 500 is selected as the next least significant byte of the output of the rotator 170. From the operation box 460, operation moves to an operation box 470. The operation box 470 illustrates that the current pointer is incremented by one to point to the next byte of the thirty-two byte block 500.

From the operation blocks 470 and 450, operation moves to a decision block 480. At decision block 480, a check is made to see whether sixteen bytes have already been selected to be output from the rotator 170. If sixteen bytes have not already been selected to be output, then operation returns to the decision block 430.

However, if from the decision block 480, sixteen bytes have already been selected to be output from the rotator 170, then operation moves to termination block 490. The sixteen-byte output has been selected and is output from the rotator 170.

FIGS. 5B, 5C, 5D, and 5E illustrate some examples of the output of the rotator 170 for various values of the new_top_of_ib pointer 172. In the implemented embodiment, a sixteen-byte instruction block is selected by the new_top_of_ib pointer 172. For example, in reference to FIG. 5B, if the new_top_of_ib pointer 172 points to byte zero, then the sixteen-byte instruction block from byte zero to byte fifteen of the thirty-two byte block rotator input 500 is selected and output from the rotator 170.

In FIG. 5C, if the new_top_of_ib pointer 172 points to byte sixteen, then the sixteen-byte instruction block from byte sixteen to byte thirty-one of the thirty-two byte block rotator input 500 is selected and output from the rotator 170.

In FIG. 5D, if the new_top_of_ib pointer 172 points to byte nine, then the sixteen-byte instruction block from byte nine to byte twenty-four of the thirty-two byte block rotator input 500 is selected and output from the rotator 170.

In FIGS. 5B, 5C, and 5D, the sixteen-byte instruction block output of the rotator 170 is straightforward. The ordering of the most significant byte to the least significant byte of the input and output of rotator 170 is maintained as the sixteen-byte instruction block is output from the rotator 170. In FIG. 5E, however, a "rotation." of the data is required. If the new_top_of_ib pointer 172 points to byte thirty, then byte thirty becomes the least significant byte of the output of the rotator 170. Byte thirty-one is the next least significant byte output, and byte zero is the subsequent next least significant byte output. Byte thirteen is the most significant byte of the output. Thus, since the upper sixteen bytes 505 of the input of the rotator 170 come from one block of instruction code, and the lower sixteen bytes 510 of the input of the rotator 170 come from a different block of instruction code, when sixteen bytes of data cannot be obtained within the same instruction block, the rotator 170 will obtain the remaining bytes from the other block of instruction code.

Reference is now made to FIG. 8 which depicts a clock-by-clock example of some typical operations and the values which would result in the instruction buffers IBy 110 and IBx 120, the top_of_ib pointer 255, the new_top_of_ib pointer 172, and the output of the rotator 170. Although the output of the rotator 170 is displayed from the most significant byte to the least significant byte, the byte corresponding to the input of the rotator is shown for clarification. The valid bits 1010, originally associated with each byte of the input block of instruction code, and currently associated with each byte of the instruction buffer IBy 110, instruction buffer IBx 120, and the rotator 170, are also shown.

The initial conditions are that the top_of_ib pointer 255 is zero, there are sixteen valid bytes in both instruction buffer IBy 110 and IBx 120, and bytes zero to fifteen of the input to the rotator 170 are being output by the rotator 170 to the ID instruction buffer 180. In clock one, the instruction decoder 190 signals to the IB control logic 150 that it can take twelve bytes of instruction code. The IB control logic 150 communicates the number of bytes that the instruction decoder 190 will accept to the pointer logic 195 via the bytes_consumed_by_ID pointer 265. The bytes_consumed_by_ID pointer 265 is added to the top_of_ib pointer 255 using the decoded adder 230. The decoded output of the decoded adder 230 is sent to the rotator 170 via the new_top_of_ib pointer 172. The rotator 170 will output bytes twelve to twenty-seven responsive to the change in the new_top_of_ib pointer 172. All of the above is performed within one clock. This tight timing constraint explains why a decoded adder implementation may be preferable to an encode-add-decode adder scheme.

In clock two, the top_of_ib register 240 is updated from the new_top_of_ib pointer 172 in the previous clock. There are four valid bytes in instruction buffer IBx 120 and sixteen valid bytes in instruction buffer IBy 110. In the initial stage of clock two, bytes twelve to twenty-seven of input to the rotator 170 are currently being output from the rotator 170 to the ID instruction buffer 180. The instruction decoder 190 signals to the IB control logic 150 that it can take ten bytes. The IB control logic 150 communicates the number of bytes that the instruction decoder 90 can accept to the pointer logic 195 via the bytes_consumed_by_ID pointer 265. The bytes_consumed_by_ID pointer 265 is added to the top_of_ib register 240 using the decoded adder 230 to get the new_top_of_ib pointer 255. In this example, bytes_consumed_by_ID 265 is ten, and the new_top_of_ib pointer 172 is twenty-two. By the end of clock two, the rotator 170 will output bytes twenty-two to thirty-one and bytes zero to five responsive to the change in the new_top_of_ib pointer 172.

It should be noted that if the instruction buffer IBx 120 has not been reloaded with another block of instruction code and there is no new block of instruction code 101 available from the buffer input 102 then bytes zero to five of the input to the rotator and which are output from the rotator 170 to the decoder do not correspond to valid bytes. In the current embodiment, valid bits 1012a–p (FIG. 10) are set appropriately to indicate that bytes zero to five corresponding to the input of the rotator 170 are invalid.

Reference is now made to FIG. 11 which shows the procedure for handling a block of instruction code from a predicted branch.

Starting with a beginning block 1100 operation moves to an operation block 1110. The operation block 1110 shows that an input block of instruction code 101 is available to the buffer input 102 from a predicted branch, i.e. from a target instruction stream. From the operation block 1110, operation moves to a decision block 1120. At the decision block 1120, a check is done to see whether an ID branch signal 192 has been asserted. If the ID branch signal 192 has not been asserted then operation returns to the decision block 1120.

However, if at the decision block 1120, once the ID branch signal 192 is asserted, operation moves to operation block 1130. The operation block 1130 illustrates that the instruction buffers IBy 110 and IBx 120 are flushed responsive to a flush signal 134 provided from the IB control logic 150 via input lines 136 and 156. The new block of instruction code 101 is allowed to enter the buffer input 102 and is written into instruction buffer IBx 120. At the same time that the block of instruction code 101 is written to the instruction buffer IBx 120, the block of instruction code 101 is provided to the bypass bus 132. The bypass bus 132 provides the block of instruction code 101 to the IB multiplexer, and the IB multiplexer will provide the block of instruction code 101 to the rotator 170.

Operation block 1130 also illustrates that the IB control logic 150 determines the initial pointer 220 (FIG. 2), which is input into the pointer multiplexer 210. The initial/normal signal 238 signals the pointer multiplexer 210 to select the initial pointer 220 as its output. The output of the pointer multiplexer 210 provides the new_top_of_ib pointer 172 to the rotator 170. From the operation block 1130, operation moves to flowchart termination block 1140.

Reference is now made to FIG. 9 which displays sample code which includes a jump instruction. If execution of the code begins at address 1000 in the initial instruction stream 920, then instructions I1, I2, I3, and I4 (and part of I5) will be read into the instruction buffers IBy 110 and IBx 120 as described previously.

However, the instruction buffers IBy 110 and IBx 120 are controlled such that at any time there is only one instruction stream in them. Instructions from the target instruction stream 940 beginning at address 2006 are not allowed to enter into the buffer input 102 until the corresponding branch has been handed over to the instruction decoder 190. This restriction has the advantage of allowing the use of a simplified instruction decoder 190 that can rotate data out of the contiguous instruction buffers without the need to process the invalid instruction gaps which might occur if sequential instruction streams were allowed to be mixed together in the instruction buffers IBy 110 and IBx 120. The simplified instruction decoder 190 has the advantage of being able to quickly signal the IB control logic 150 with the number of bytes that the instruction decoder 190 can accept.

The input 960 to the rotator 170 is shown along with its associated valid bits 1010. The instructions from input 960 will be passed to the instruction decoder 190 prior to the switch to the new target address stream 940.

Once the instructions from the input 960 have been sent to the instruction decoder 190, the instruction decoder 190 will signal the IB control logic 150 via the ID branch signal 195. The instruction buffers IBy 110 and IBx 120 will be flushed, and the instruction buffer IBx 120 will be reloaded with an input block of instruction code 990 from the new target address stream 940.

The input 980 of the rotator 170 is provided by the bypass bus 132. The new_top_of_ib pointer 172 is initialized to point to the first valid instruction of the input block of instruction code 990. The valid bits will also be appropriately set to indicate that the input block of instruction code 990 has some invalid instructions. The instruction buffer IBy 110 will be written when the next block of instruction code 101 is available, and the processing of new input blocks of instruction code 101 will continue as previously discussed.

Reference is now made to FIG. 12 which shows the procedure for handling a mispredicted branch.

Starting with a beginning block 1200 operation moves to an operation block 1210. The operation block 1210 shows that the IB control logic 150 detects a mispredicted branch. From operation block 1210, operation moves to operation block 1220.

The operation block 1220 illustrates that the instruction buffers IBy 110 and IBx 120 are flushed responsive to a flush signal 134 provided from the IB control logic 150 via input lines 136 and 156. The new block of instruction code 101 is allowed to enter the buffer input 102 and is written into instruction buffer IBx 120. At the same time that the block of instruction code 101 is written into the instruction buffer IBx 120, the block of instruction code 101 is provided to the bypass bus 132. The bypass bus 132 provides the block of instruction code 101 to the IB multiplexer 130, and the IB multiplexer 130 will provide the block of instruction code 101 to the rotator 170.

Operation block 1220 also illustrates that the IB control logic 150 determines the initial pointer 220 (FIG. 2), which is input into the pointer multiplexer 210. The initial/normal signal 238 signals to the pointer multiplexer 210 to select the initial pointer 220 as the output of the multiplexer 210. The output of the pointer multiplexer 210 provides the new_top_of_ib pointer 172 to the rotator 170. From the operation block 1220, operation moves to flowchart termination block 1230.

From the above description, it will be apparent that the invention disclosed herein provides a novel and advantageous buffer and rotator circuit. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. In a computer which executes variable-length instructions, and includes first and second buffers for storage of instructions provided from a memory, a bypass bus coupled to the memory that bypasses the first and second instruction buffers, a multiplexer configured to select between the first and second instruction buffers and the bypass bus, a rotator coupled to the multiplexer, an instruction decoder coupled to the rotator, and instruction buffer logic for control thereof, a method of handling instructions from a branch comprising the steps of:

(a) flushing instructions of an initial instruction stream from the first and second instruction buffers responsive to a flush signal generated by the instruction buffer logic;

(b) loading the first instruction buffer with a first block of instructions of a target instruction stream specified by the branch;

(c) providing instruction bytes to the rotator via the bypass bus;

(d) initializing a pointer generated by the instruction buffer logic to point to a byte location in the first block of instructions associated with a first valid instruction of the target instruction stream;

(e) loading a next block of instructions of the target instruction stream into the second instruction buffer;

(f) alternately selecting by the multiplexer instructions of the target instruction stream from the first and second instruction buffers for input to the rotator;

(g) rotating by the rotator the instructions provided by the multiplexer in accordance with the pointer to align the instructions on boundaries.

2. The method according to claim 1 further comprising the initial steps of:

decoding a jump instruction of the branch;

providing a branch signal to the instruction buffer logic by the instruction decoder, wherein step (a) is performed responsive to the branch signal.

3. The method according to claim 2 further comprising the step, prior to step (a), of:

fetching the first block of instructions responsive to the branch signal; and loading the first block of instructions into an input buffer.

* * * * *